(12) United States Patent
Alexander et al.

(10) Patent No.: US 8,086,472 B2
(45) Date of Patent: *Dec. 27, 2011

(54) APPARATUS AND METHOD FOR MANAGING PRESCRIPTION BENEFITS

(75) Inventors: Jeffrey H. Alexander, Flemington, NJ (US); William J. Jackson, West Orange, NJ (US); Glen D. Stettin, Upper Saddle River, NJ (US); Mark A. Carlson, Westerville, OH (US); Nicholas C. Taylor, Upper Arlington, OH (US); Zev Juravel, New Hempstead, NY (US); Richard P. Healy, Bronxville, NY (US)

(73) Assignee: Medco Health Solutions, Inc., Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,596

(22) Filed: Aug. 10, 2010

(65) Prior Publication Data

US 2010/0324939 A1 Dec. 23, 2010

Related U.S. Application Data

(60) Continuation of application No. 11/635,714, filed on Dec. 7, 2006, now Pat. No. 7,774,213, which is a division of application No. 10/334,981, filed on Jan. 2, 2003, now Pat. No. 7,155,397.

(60) Provisional application No. 60/349,352, filed on Jan. 22, 2002.

(51) Int. Cl.
G06Q 10/00 (2006.01)

(52) U.S. Cl. .............................. 705/2; 705/4

(58) Field of Classification Search .................. 705/2, 3, 705/4
See application file for complete search history.

(56) References Cited

U.S. PATENT DOCUMENTS

| 5,546,580 | A | | 8/1996 | Seliger et al. |
| 5,664,109 | A | | 9/1997 | Johnson et al. |
| 5,732,401 | A | | 3/1998 | Conway |
| 5,737,539 | A | | 4/1998 | Edelson et al. |
| 5,787,416 | A | * | 7/1998 | Tabb et al. ................. 707/738 |
| 5,845,255 | A | * | 12/1998 | Mayaud ...................... 705/3 |
| 6,067,524 | A | | 5/2000 | Byerly et al. |

(Continued)

FOREIGN PATENT DOCUMENTS

EP 1258813 A2 11/2002

OTHER PUBLICATIONS

PCT International Search Report from PCT/US2003/001652, issued Sep. 22, 2003.
Written Opinion from PCT/US2003/001652, issued Oct. 12, 2004.
Stein and Chiplin, A Practical Guide to Medicare Hearings and Appeals, Fall 1999, Real Property Probate and Trust Journal, pp. 403-441.

(Continued)

*Primary Examiner* — Gerald J. O'Connor
*Assistant Examiner* — Hiep V Nguyen
(74) *Attorney, Agent, or Firm* — Stroock & Stroock & Lavan LLP

(57) ABSTRACT

A system and method are disclosed for managing prescription benefits. Case records containing information regarding patients and prescription coverage activities for the patients are stored in the system. Users are allowed access to the system via an appropriate electronic communication network. The user can subsequently perform various tasks in order to maintain and review coverage activities. The user can also enter additional prescription coverage activities into the case records, as well as verify that information entered into the case records has been updated.

31 Claims, 12 Drawing Sheets

U.S. PATENT DOCUMENTS

| | | | |
|---|---|---|---|
| 6,240,394 | B1 | 5/2001 | Uecker et al. |
| 6,263,330 | B1 | 7/2001 | Bessette et al. |
| 6,282,531 | B1 | 8/2001 | Haughton et al. |
| 6,283,761 | B1 * | 9/2001 | Joao .............................. 434/236 |
| 6,324,516 | B1 | 11/2001 | Shults et al. |
| 6,343,271 | B1 | 1/2002 | Peterson et al. |
| 6,356,873 | B1 | 3/2002 | Teagarden et al. |
| 6,473,752 | B1 | 10/2002 | Fleming |
| 2001/0037216 | A1 * | 11/2001 | Oscar et al. ........................ 705/2 |
| 2002/0143579 | A1 | 10/2002 | Docherty et al. |
| 2003/0074234 | A1 * | 4/2003 | Stasny .............................. 705/4 |
| 2003/0082863 | A1 * | 5/2003 | Lim et al. ...................... 438/199 |

OTHER PUBLICATIONS

Clouds Computing: Quality, OptumHealth's eSync system assembles medical and drugs records in one place and sends out alerts . . . , in Depth, Business Week, Jun. 4, 2009.

Synchronizing Health Care Management for Optimal Wellness, Optum Health, eSync platform brochure, 2009.

OptumHealth unveils major new technology platform to improve health care quality for millions of Americans . . . , HIMSS Annual Conference, Apr. 6, 2009.

United Healthcare's optum division goes on the line to better health by announcing a unique internet application, PR Newswire, Aug. 1, 1996.

* cited by examiner

APPARATUS AND METHOD FOR MANAGING PRESCRIPTION BENEFITS

RELATED APPLICATIONS

This application is a Continuation of U.S. patent application Ser. No. 11/635,714, filed Dec. 7, 2006, now U.S. Pat. No. 7,774,213, issued Aug. 10, 2010, which is a Divisional of U.S. patent application Ser. No. 10/334,981, filed Jan. 2, 2003, now U.S. Pat. No. 7,155,397, issued Dec. 26, 2006 which claims the priority of U.S. Provisional Application No. 60/349,352 filed Jan. 22, 2002, all of which are incorporated herein by reference.

BACKGROUND OF THE INVENTION

1. Technical Field

The present invention relates to prescription benefits and, more particularly, to a method and system for managing prescription benefits coverage.

2. Description of the Related Art

Various employers offer healthcare coverage to their employees. The healthcare coverage will typically include the cost of prescription drugs (or products), in whole or in part. The healthcare coverage can also cover the cost of certain treatments. The type of prescription coverage offered to the employee can vary depending on the particular healthcare provider selected by the employer. The specific coverage offered to an employee can depend on several factors, including the particular coverage program negotiated by the employer. For example, the benefits available can be different depending on the medical coverage desired, the prescription medication available, etc. Furthermore, the specific benefits requested will directly effect the coverage cost.

Regardless of the coverage, the healthcare provider will place certain restrictions and/or limitations on the prescription medication available. These restrictions determine whether the healthcare provider will cover the cost of a prescription claim in full or in part. For example, the healthcare provider may cover the cost of a prescription claim in full, if the employee is willing to substitute a generic form of the prescribed medication. The cost of the prescription can be subsidized to different degrees, depending on the type of coverage, for example, if the employee prefers to use a brand name form of the medication.

Oftentimes, the healthcare provider will negotiate actual medication costs with one or more pharmaceutical companies in order to arrive at a coverage plan which best satisfies the budgetary requirements of the employer. For example, depending on the size of the healthcare provider or employer, various discounts can be allowed if a certain number of patients subscribe to the plan. Costs can be controlled by substituting generic forms of a drug (i.e., product) in place of name brand form. Costs can also be controlled based on the drug (i.e., product) used to treat a particular disease or condition.

Implementation of a healthcare coverage plan requires administrative procedures to address circumstances when a patient requires specialized treatment and/or medication. While such treatments may be supported by the coverage plan, the extent of coverage may be limited due to, for example, a very low rate of occurrence. Healthcare providers can conduct negotiations with employers in order to reach an agreement on how the coverage plan will address these special circumstances. These negotiations can often include guidelines for dealing with coverage of special medication and/or treatment not desired by the employer due to, for example, higher costs. For example, the coverage plan can require that a patient seek alternative forms of treatment prior to obtaining coverage for a specialized medical procedure. The patient may also receive coverage for certain types of drugs (i.e., products) only if alternative drugs have been tried unsuccessfully.

Healthcare coverage plans must also provide patients with an avenue for dispute resolution/mediation of claim denials for coverage of treatments and medications (e.g., coverage denials), whether basic or specialized. This can be in the faun of an appeal or review process which examines the underlying circumstances for denying coverage of the treatment and/or medication. The specific details for dispute resolution and mediation must also be negotiated between the employer and healthcare provider as part of the coverage plan.

Healthcare providers can face difficulties in managing coverage plans depending on various factors. For example, a healthcare provider may render services to a number of employers, each of whom must offer coverage to multiple patients. The number of patients can vary, of course, based on the size of the employer and availability of alternative coverage plans (e.g., alternative healthcare providers). In the case of a large employer with few alternative coverage plans, the healthcare provider may be responsible for managing benefits of a great deal of patients. This situation is further complicated if the healthcare provider extends coverage plans to additional large employers.

When claims are received by the healthcare provider, they must be reviewed to ensure that they are supported by the patient's coverage plan. In the case of prescriptions, immediate approval or denial is required while the pharmacist prepares the prescription. It can be difficult to quickly approve or deny the prescription if the patient's prescription plan includes a large number of restrictions. Further complications arise when the patient requires specialized medication. It is possible to mistakenly support the prescription claim through the coverage plan if a restriction is overlooked. It is also possible to mistakenly deny the prescription claim if a restriction is misinterpreted.

Both situations can prove costly over time. For example, if prescription claims are mistakenly supported, the healthcare provider must absorb the loss rather than bill the client for the cost of covering the prescription claim. On the other hand, if prescriptions are mistakenly denied, clients may become dissatisfied and seek another healthcare provider. Consequently, healthcare providers must exercise care in managing the different coverage plans under their control.

The result of these negotiations is a comprehensive set of treatment and medication coverage rules. The coverage rules define the terms and/or conditions for approving, denying, and appealing coverage of basic and specialized treatment and medications. The coverage rules can be extensive and often must be converted into electronic form to assist in administration of the coverage plan.

Accordingly, there exists a need for a prescription benefits management system that addresses at least some of the current shortcomings of existing systems.

There also exists a need for a prescription benefits management system that allow healthcare providers to easily and efficiently manage multiple healthcare coverage plans.

There exists another need for a prescription benefits management system that minimizes the number and costs of errors associated with processing prescription claims.

There exists a further need for a prescription benefits management system that optimizes the medications and treatments available to patents.

There exists a still further need for a prescription benefits management system that optimizes the cost paid by patients to obtain prescription coverage.

SUMMARY OF THE INVENTION

It is therefore one feature and advantage of the present invention to address at least some of the shortcomings of the prior art in managing prescription benefits.

It is another optional feature and advantage of the present invention to provide a prescription benefits management system capable of allowing management of multiple healthcare coverage plans.

It is yet another optional feature and advantage of the present invention to provide a prescription benefits management system capable of minimizing the number of errors associated with processing prescription claims.

It is a further optional feature and advantage of the present invention to provide a prescription benefits management system capable of optimizing the medications and treatments available to patients.

It is a still further optional feature and advantage of the present invention to provide a prescription benefits management system of optimizing the cost paid by patients to obtain prescription coverage.

The foregoing, and various other needs, are addressed, at least in part, by the present invention, wherein a benefits management system allows case records to be managed, searched, and modified quickly and efficiently from central location.

According to one embodiment of the invention, a method is provided for managing prescription benefits using a prescription benefit management system. The method comprising the steps: accessing a case record containing information regarding a patient and prescription coverage activities for the patient; conducting an inquiry on the case record to view and/or review selected prescription coverage activities contained in the case record; inputting additional prescription coverage activities into the case record, if necessary; verifying that the case record has been updated, if additional prescription coverage activities will not be inputted; and closing the case record. According to such a method, multiple prescription benefits coverage plans can be easily and efficiently managed in order to optimize the cost of service to patients. Furthermore, the range of treatments (or medications) available to patients can be increased.

According to certain optional aspects of the invention, users can obtain various instructional and informative information while using the prescription benefits management system. More particularly, users can easily obtain help documentation regarding certain topics while using the system. Actual technical and reference manuals are also available for access while using the system. Status reports can also be obtained to identify various reasons why a claim for prescription coverage may have been approved or denied. Users can also access a reference library containing documents used to support decisions, such as a prescription coverage denial.

According to another optional embodiment of the invention, certain users can access case records that are currently open and release (or close) such case records. For example, a case record being viewed by a user can be opened by a special user. Next, the special user can release the case record without the user's authorization. Such a feature can allow administrative personnel to modify and/or update case records without the need to wait for users to finish accessing those case records. Furthermore, such a feature can assist in maintaining case records stored in the prescription benefits management system. For example, there are situations where case records may be inadvertently left open or otherwise become inaccessible. An administrative personnel, for example, could access and close the case record, thereby making it available for use by other users.

According to another optional embodiment of the present invention, users can view the reasons used to deny a prescription coverage, including any specific details pertaining to the denial. Administrators can review such denials and impose an override based on various clinical criteria. Users can also process appeals received for denial of a prescription coverage, and subsequently reverse the denial. As part of the reversal, an original prescription product can optionally be replaced by a substitute product which has the same benefits of the original product, but is covered under the patients prescription benefits program.

According to another aspect of the invention, an arrangement system for managing prescription benefits comprises a prescription benefits management system, a communication device, and a user computer. The prescription benefits management system stores a plurality of case records that contain information regarding patients and prescription coverage activities for the patient. The communication device is coupled to the prescription benefits management system for providing access to users over one or more electronic communication networks. A user is capable of utilizing the user computer to access the prescription benefits management system from a remote location. The prescription benefits management system further allows users to: conduct an inquiry on the case records to view and/or review selected prescription coverage activities contained in the case record; input additional prescription coverage activities into the case records, if necessary; verify that the case records have been updated, if additional prescription coverage activities will not be inputted; and close the case records. According to such an arrangement, prescription benefits coverage plans can be easily and efficiently managed in order to optimize the cost of service to patients. Furthermore, the range of treatments (or medications) available to patients can be increased.

There has thus been outlined, rather broadly, the more important features of the invention and several, but not all, embodiments in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF THE INVENTION

Figure 1:
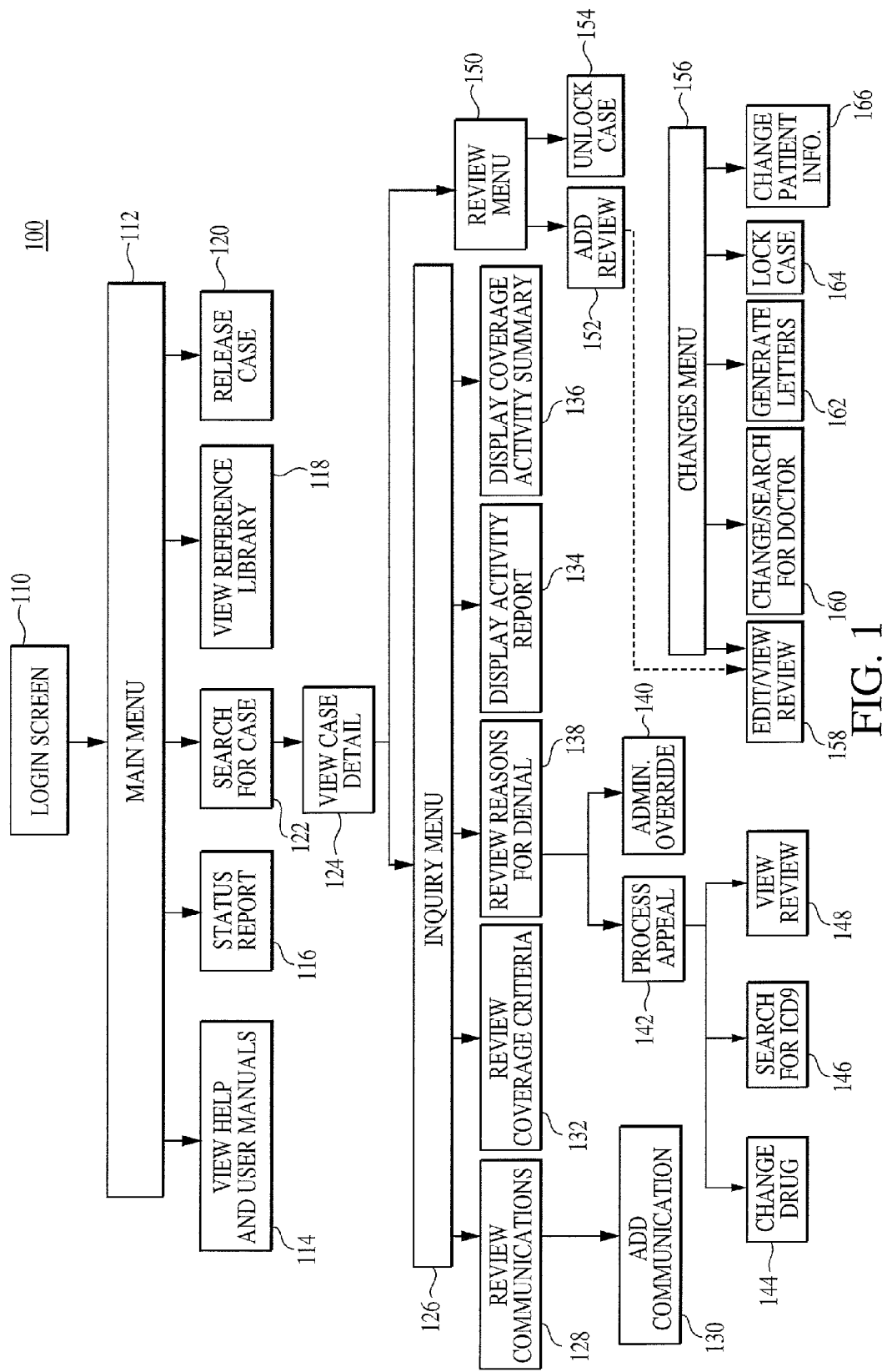
FIG. 1 is a block diagram illustrating a hierarchical menu layout of a prescription benefits management system according to an exemplary embodiment of the present invention.

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Prior to describing the details of the invention, a brief discussion of some of the notations and nomenclature used in the description will be presented. Next, a description of exemplary hardware useable in practicing the invention will be presented.

Notations and Nomenclature

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in teems, such as adding or comparing, which are commonly associated with mental operations performed by a human operator. No such capability of a human operator is necessary, or desirable in most cases, in any of the operations described herein which faun part of the present invention; the operations are preferably machine operations, although the operations may also be manual in alternative embodiments. Useful machines for performing the operation of the present invention include general purpose digital computers or similar devices.

The present invention also relates to apparatus for performing these operations. This apparatus may be specially constructed for the required purpose or it may include a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. Alternatively, one or more of the steps may be performed manually. The required structure for a variety of these machines will appear from the description given.

Hardware Overview

Figure 12:
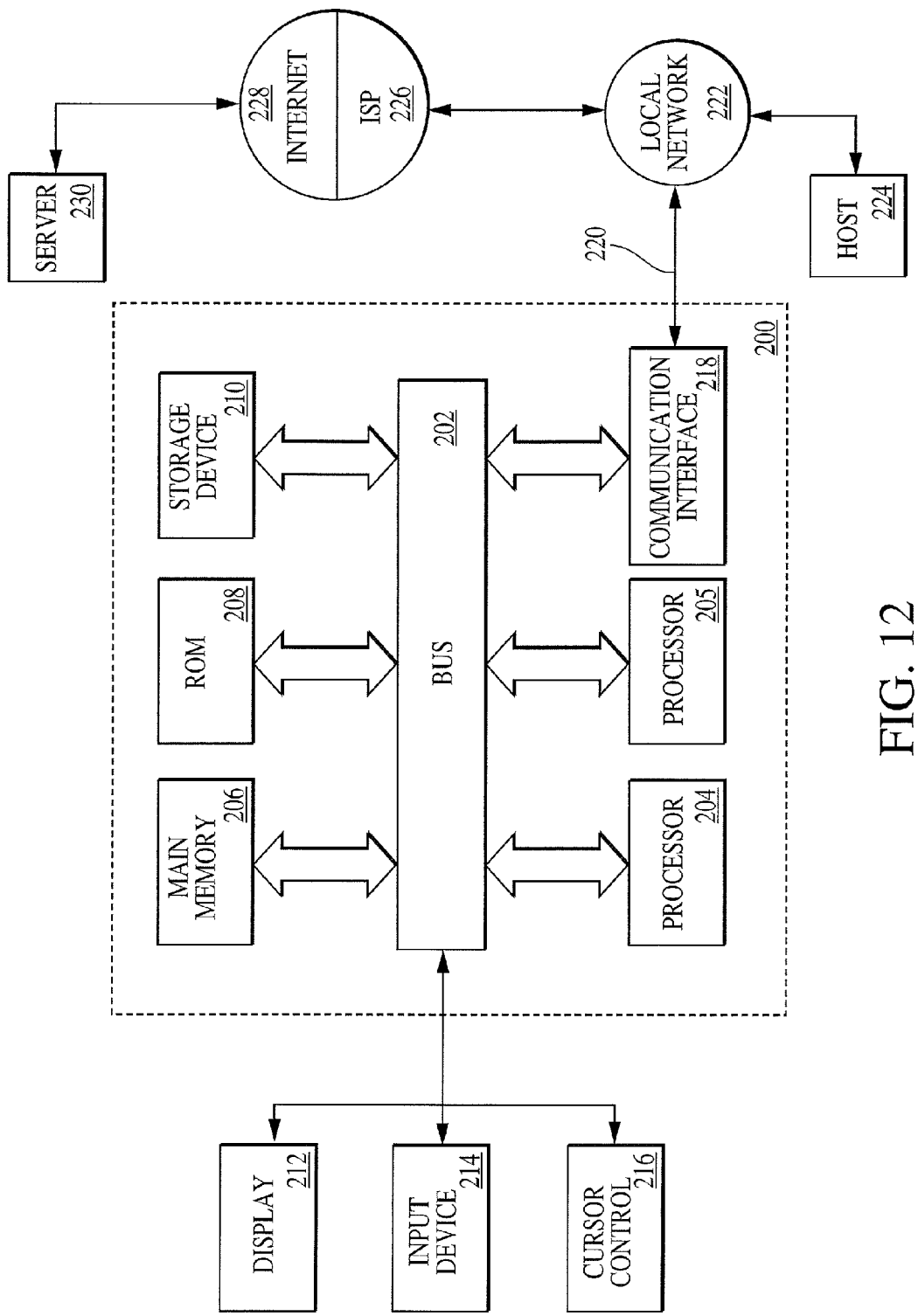
FIG. 12 is a block diagram illustrating an exemplary computer system for implementing an embodiment of the prescription benefits management system.

FIG. 12 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for managing prescription benefits. According to one embodiment of the invention, managing prescription benefits is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media include, for example, optical or magnetic disks, such as storage device 210. Volatile media include dynamic memory, such as main memory 206. Transmission media include coaxial cables, copper wire and fiber optics, including the wires that comprise bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network, now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220, and communication interface 218. In the Internet example, a server 230 might transmit a requested code for an application program through Internet 228, ISP 226, local network 222 and communication interface 218. In accordance with the invention, one such downloaded application provides for managing prescription benefits as described herein. The received code may be executed by processor 204 as it is received, and/or stored in storage device 210, or other non-volatile storage for later execution. In this manner, computer system 200 may obtain application code in the form of a carrier wave.

Prescription Benefits Management System

Turning now to the drawings and initially to FIG. 1, a block diagram is shown for illustrating a menu hierarchy of a prescription benefits management system 100 in accordance with an exemplary embodiment of the present invention. The prescription benefits management system 100 is designed to provide users an ability to conveniently manage and implement a prescription benefits program. These abilities include, but are not limited to: browsing coverage related information, aggregating coverage activities summary, administering appeal procedures, and generating related correspondences. The prescription benefits management system 100 is also capable of administering coverage reviews and generating related correspondence; tracking and managing contacts/ communications with members (e.g., employers), physicians, and pharmacist; and creating and maintaining coverage criteria.

The prescription benefits management system 100 can be remotely accessed by various users including, but not limited to, patients, clients (e.g. employers, healthcare providers, etc.), and administrators in order to obtain and review information regarding their prescription benefit program. Access can be provided, for example, using an appropriate communication interface 218 and/or device, as discussed with respect to FIG. 12. For example appropriate network connectors and/or high speed communication devices (cable modem, DSL modem, satellite data transfer, etc.) can be used in conjunction with an ISP 226 to establish the connection.

The prescription benefits management system 100 provides support to healthcare administrators in processing pharmaceutically related coverage review and/or appeals by providing real-time access to coverage information for members. For example, the coverage information can include the coverage criteria, case activity, reasons for denial, etc. The prescription benefits management system 100 can be configured as a rules-based Coverage Management Workstation (CMWS) for easily implementing, modifying, and utilizing prescription benefit programs for multiple clients (or employers).

As illustrated in FIG. 1, the prescription benefits management system 100 presents the user a hierarchical menu system that allows the user to access various information and perform tasks necessary to properly manage the prescription benefits of a client. Furthermore, the client can also access the prescription benefits management system 100 in order to obtain and/or review information pertaining to its account. Although FIG. 1 illustrates specific menus and transactions that can be accessed, it should be noted that the prescription benefits management system 100 can also include various other menus and transactions. The specific implementation of the system, as well as client needs, will determine the exact menu layout to be used. For example, the prescription benefits management system 100 can include menus for performing any and all tasks related to management of prescription benefits. Furthermore, alternative embodiments of the prescription benefits management system 100 can include different menu layouts that allow users to more efficiently perform the tasks necessary to manage a client's prescription benefits.

According to the exemplary hierarchy, the prescription benefits management system 100 provides users with an initial login screen 110. The login screen 110 can be used, for example to request a username/password combination, an account/password combination, etc. The login screen 110 is used, in part, to verify that the user is authorized to access the prescription benefits management system 100. This is particularly significant in embodiments of the prescription benefits management system 100 that allow remote access through open, or public, networks. More particularly, the prescription benefits management system 100 can be assessed in several ways. Users can access the system through private, or local area networks (LANs) that provide a different level of security because all users are internal users (e.g. employers) of a company. However, certain embodiments can allow access by external users through public networks such as the Internet and/or World Wide Web (WWW). In such instances, authentication is important because a malicious user can attempt to gain unauthorized access. Once access is gained, such a user can change, modify, or possibly destroy records and/or other data stored on the prescription benefits management system 100.

The login screen 110 can also be used to automatically establish access rights to certain users. For example, an administrative user may have designated authority to change, modify, or create information stored on the prescription benefits management system 100. A staff member (e.g., a customer service representative) may have the authority to view, change, or modify data without being able to create new records. A client or patient accessing the prescription benefits management system 100 may only have the authority to view information, respond to questions, and/or enter data into forms. Again, such access rights can vary depending on the specific implementation of the prescription benefits management system 100.

Upon successful login to the prescription benefits management system 100, the user is presented with a main menu 112. The main menu 112 can be presented through a graphical interface that includes icons, menus, buttons, etc. representative of available options. The user could make selections using an available cursor control device 216 (illustrated in FIG. 12), as previously discussed. Alternatively, the main menu 112 can be presented to the user through a text, or non-graphical, interface. The user would then use various combinations of keystrokes from the input device 214 to make the proper selection.

According to the embodiment of the prescription benefits management system 100 illustrated in FIG. 1, the main menu 112 provides the user with five menu (or submenu) options. Namely, the user has an option to view help and user manuals 114, obtain a status report 116, view a reference library 118, release a case 120, or search for one or more cases 122. As previously discussed, other options may be provided depending on implementation and client needs.

The view help and user manuals menu 114 provides the user access to various documentation to assist in operating the prescription benefits management system 100. When the user accesses this menu, they can be presented with additional submenus that require input specific for accessing user manuals or help manual. The help manuals can be in the form of context-sensitive on-line documents. In addition, the help manuals can be in the form of individual pages that contain descriptive text on certain components of the prescription benefits management system 100. The help manuals could be used, for example, to provide an overview or assistance with the prescription benefits management system 100, and would not be intended to provide detailed and/or technical information regarding the prescription benefits management system 100. According to one embodiment of the present invention, the view help and user manuals menu 114 can be accessed from any menu level (e.g., accessible from every menu presented) in the prescription benefits management system 100. Accordingly, a user could always seek assistance. In addition, the pages of the help manual can include descriptive text about the menu, or page, from which the user requested help.

According to the illustrated embodiment of the invention, the user manuals are electronic versions of the actual manuals/documentation for the prescription benefits management system 100. The user manuals can be stored in various formats to facilitate and simplify access by users. Such formats include, but are not limited to, plain text, formatted text, word processor-specific format (e.g. MS Word, WordPerfect, etc), Adobe Acrobat, hypertext, HTML, etc. Accordingly, the user would be capable of conveniently obtaining the same information contained in the actual reference manuals directly from the computer. The prescription benefits management system 100 can also be configured to automatically access necessary, or helper, applications to display both the user manuals and the help pages.

The user can optionally access the status report menu 116. The status report menu 116 allows the user to obtain information regarding approvals, denials, and other status data based on product or application. The information displayed on the status report menu 116 can include hyperlinks for information such as contract, carrier, client id, etc. When the hyperlinks are selected, the prescription benefit management system 100 would automatically generate or retrieve the appropriate status report. The status report menu 116 can also include search fields that allow the user to enter certain criteria, such as a specific date range, for which the report will be generated. The actual status report criteria can be pre-determined in the event the user does not wish to enter a date range. In such instances, the default period could be, for example, the most recent 24-hour period. Depending on the users specific access level, the status report menu 116 can optionally provide an option to print the report generated. Furthermore, the user can be given an option to select or change the particular client for which the report is being viewed.

According to one embodiment of the present invention, the prescription benefit management system 100 is optionally configured to automatically generate quarterly status reports for each client. Thus, unless a user requires status information that is less than three months old, the quarterly status report can be automatically or manually retrieved. According to an optional embodiment of the present invention, the quarterly status report would contain information for all clients. Alternatively, the user can input specific criteria to identify one or more clients. The status reports would then be generated for the identified clients.

The user can select the view reference library menu 118 in order to examine various documents used to support decisions made for a particular case record. Such decision support document are typically authored by users having administrative privileges. Non-administrative users are free to access and view documents stored in the reference library, although they are unable to make any changes. The decision support documents can be organized by product group and configured to take various forms. For example, one implemented document group contains coverage summary documents which describe a product and also describe prior authorization criteria and/or rationale necessary for supporting a coverage denial. Another type of decision support document is a reference document which contains a list of citations referring to external reference articles and/or other publications that have been used to support a particular coverage denial. Depending on the decision being made, a product may include a coverage summary document, while only certain products will have an associated reference document. In general, all products will contain a coverage summary document while not all will require a reference document. When the user accesses the list of citations, hyper-text links can be used in order to retrieve the actual text or content of individual citations.

The release case menu 120 allows users to release a case record being held by another user. This is beneficial for preventing multiple edits to different copies of the original file. Typically, only administrative users are given the option to release a case record. This safeguard minimizes the number of users capable of incorporating changes to a case record, thus minimizing potential errors. For example, if a first user is currently viewing a case record, that case record is considered held by the user. A copy of the information stored in the prescription benefits management system 100 is displayed to the first user. If a second user accesses the same case record, then another copy of the case record is retrieved and displayed to the second user. Both copies reflect the original case record stored on the prescription benefit management system 100. If both users were to make changes to the case record and simultaneously attempt to save the document, various errors can occur. Furthermore, not all of the changes would be entered in the case record. In order to avoid such mistakes, case records must first be released before changes can be implemented. Accordingly, if the second user is an administrative user, the second user would have the authority to release the case record and close the copy being used by the first user so that changes can be made and appropriately saved to the prescription benefit management system 100.

According to one embodiment of the present invention, if a user accesses a case record, the prescription benefits management system 100 will automatically provide an indication of whether the case record is being held or not. There are also situations wherein improper logout by a user can cause a case record to remain open in the prescription benefits management system 100, although no users are currently accessing the case record. In such situations, an administrator can access the case record and release it in order to clear the status.

The search for case menu 122 (e.g., search menu) allows a user to input various search criteria to retrieve case records. Most users accessing the prescription benefits management 100 will access the search menu 122 in order to retrieve one or more desired case records. Upon accessing the search menu 122, the user is presented with a search page which can be pre-populated with certain search fields. The user would then input one or more search terms in each search field in order to conduct the search. Because of its potentially significant and routine use, the search menu 122 can be made accessible throughout various menu levels in the prescription benefits management system 100.

According to one embodiment of the present invention, the search page generated by the search menu 122 can include an archive parameter. When a user conducts a search, the prescription benefits management system 100 examines the archive parameter to determine whether both historical and current data should be retrieved. Typically, the archive parameter is left unselected. The time period containing current data can be optionally defined using a pre-determined time range such as, for example, 18-months. Thus, an archive search would access data that is older than 18 months. This search can be conducted in conjunction with, or independent of, the current search. More particularly, the user would have an option to search only current case records or search both current and archived case records. Once a search has been successfully conducted, the prescription benefits management system 100 generates a search results page containing a list of case records matching the search criteria. Furthermore, hyper-text links can be provided in order to access selected case records directly from the list.

Once a user determines that a case record is relevant, the view case detail menu 124 can be selected. A case activity detail page is generated to provide specific information for the selected case record. Depending on the users access level various paths may be followed subsequent to displaying the case activity detail. Non-clinical (or external) users can be directed to limited options, while clinical (or external) users can be directed to a menu page having at least the same number of options as the non-clinical users. Clinical users will often be administrators or employees of the organization operating the prescription benefits management system 100. According to one embodiment of the invention, the user can be presented with an inquiry menu 126 containing the option to access multiple sub-menus such as, for example: review communications 128, review coverage criteria 132, review of reasons for denial 138, display activity report 134, display coverage activity summary, and review of reasons for denial 138.

The review communication menu 128 provides a list of all communication items that have occurred for the case record. Thus, all activity associated with a particular case record and within a predetermined activity period will automatically be displayed. For example, each activity can be presented an entry that includes a header defining the type of communication, the status of the communication, the start date, and the end date for the communication. A history of each communication type can also be presented to the user. While reviewing the list of communication items, the user has an ability to review the details of each specific communication. Again, such a feature can optionally be implemented using hyper-text links that will retrieve the actual communication record. Furthermore, the user can select the add communication menu 130 in order to generate a new communication entry for a client or for a case record currently being viewed.

Administrative and clinical users also have access to the coverage criteria menu 132. The coverage criteria menu 132 is preferably accessed while a user is viewing a case record. Each coverage criteria entry can optionally consist of a question, answer, comment, and optional supplemental data field. The coverage criteria corresponds to a sequence of questions and answers that has lead the prescription benefits management system 100 to render a particular decision regarding coverage for a product or treatment. According to one embodiment of the present invention, only activities that have been denied coverage can be reviewed from this menu. Thus, if a claim for a particular product/treatment has been approved, users will not be able to review the coverage criteria. It should be noted, however, that administrative users can be provided access to the coverage criteria even if the product/treatment has been approved in order to conduct administrative tasks. Users can optionally access the activity report menu 134 in order to display all information pertaining to a particular activity. For example, the user can obtain information pertaining to the physician, the patient, the member, the coverage criteria, reasons for denial, etc. Once the user selects to view the activity report for a case record, the report generated can subsequently be printed.

The coverage activity summary menu 136 provides the user with an ability to view a custom breakdown of approvals, denials, and other status data by product and application. The report generated include data regarding the client's organizational archive such as, the organization id, the carrier, and the contract. Certain information, such as the contract and carrier can optionally be in the form of hyper-text links that will access a report specific to either a particular contract or an aggregated carrier. According to one embodiment of the present invention, the user can be provided with a series of links that allow selection of a time period for which the reports are generated. For example, the links can identify periods which define the previous week, a rolling seven day period preceding the current day, etc. It should be noted that in such cases, the previous week can be defined as a fixed interval from Sunday to Sunday, or Saturday to Saturday, etc. Thus, the previous week and the rolling seven day period would, in certain substances, provide different date ranges. Furthermore, if a particular date does not contain an activity, then the field will be empty.

According to one embodiment of the present invention, the coverage activity summary can display a list of product rows and/or a list of product category rows. For each product row, the corresponding columns could include a tabulation of coverage approvals and coverage denials for each activity type (e.g., primary, renewal, appeal, administrative override, clarification, etc.). Furthermore, since administrative overrides are never denied, the reports could be configured to only display a field which tabulates the coverage approvals. Cases that are either open or pending are collectively identified as "work in progress." The reasons for denial menu 138 allows administrators and clinical users to determine why an activity has been denied coverage. This feature is only accessible when a user is currently viewing a case record.

According to one embodiment of the present invention, the case record can include a status indication that identifies whether an activity has been denied coverage. When the user accesses this feature, a list of reasons is generated. Each individual reason provides the user with an indication of where the explanation for denying the activity can be found. For example, if the reason for coverage denial is based on answers to criteria questions, then an indication that the reason can be found from the "reason" table is provided. If the reason for coverage denial is based on an override, then the details would be found in an activity comments form. If the reason for coverage denial is based on an appeal then the details would be found in the appeal details form.

While reviewing the reasons for denying an activity, an administrator can have various options. An administrative override can be performed to override denial of the activity. The administrative override could optionally be based on concrete, non-clinical criteria. The user can also process an appeal of the coverage denial. In processing the appeal, the user can either override or uphold a primary denial based on clinical reasons. Typically, question and answer type criteria cannot be used to either uphold or override a primary coverage denial. When processing an appeal, the user may elect to change the product that is associated with the current appeal by selecting the change drug menu 144. One advantage of such a change is that a different product may be useable for treating the same illness without resulting in denial of the particular activity. For example, the user can enter the name of the new product as well as the eleven digit NDC code to enter the new product. The user can also elect to add an ICD9/diagnosis to the appeal by selecting the search for ICD9 menu 146. This feature performs a search on the prescription benefit management system's ICD9 database to obtain matching codes and descriptions for different products. Once satisfied with the appeal process, the user can elect to view the workflow undertaken during the review of an activity by selecting the view review menu 148.

The user can also be directed from the view case details menu 124 to a review menu 150. The review menu 150 presents the user with an option to add a review to the case or to unlock a particular case. In order to add a review, the user selects the add review menu 152 and is further presented with an edit/view review menu 158. This allows the user to initiate one of the two types of review processes, namely the appeal process and the administrative override. In addition, the add review 152 menu can provide the user with the option of generating an unclassified review type which can be used to investigate a coverage denial based on miscellaneous criteria. The user can also elect to unlock a case from the review menu 150. Typically, if changes are being made to a case record, the prescription benefits management system 100 will lock the case record in order to prevent someone from simultaneously accessing the same case record and making further edits. Accordingly, it should be noted that administrative privileges will often be necessary to unlock a case.

Once a case is unlocked, the user is presented with the changes menu 156 wherein they can perform various changes to the case record. For example, the user can search for a specific doctor and/or change the current doctor assigned to a particular patient by selecting the change/search for doctor menu 160. The user can also generate letters and correspondence to be sent out to the patients by selecting the generate letters menu 162. By selecting the lock case menu 164, the case record can be locked in order to prevent access by, for example, non-administrative personnel. Changes to the patient's information can also be performed by selecting the change patient info menu 166. Such changes can correspond to, for example, the patients name, address, and other personal data.

Figure 2:
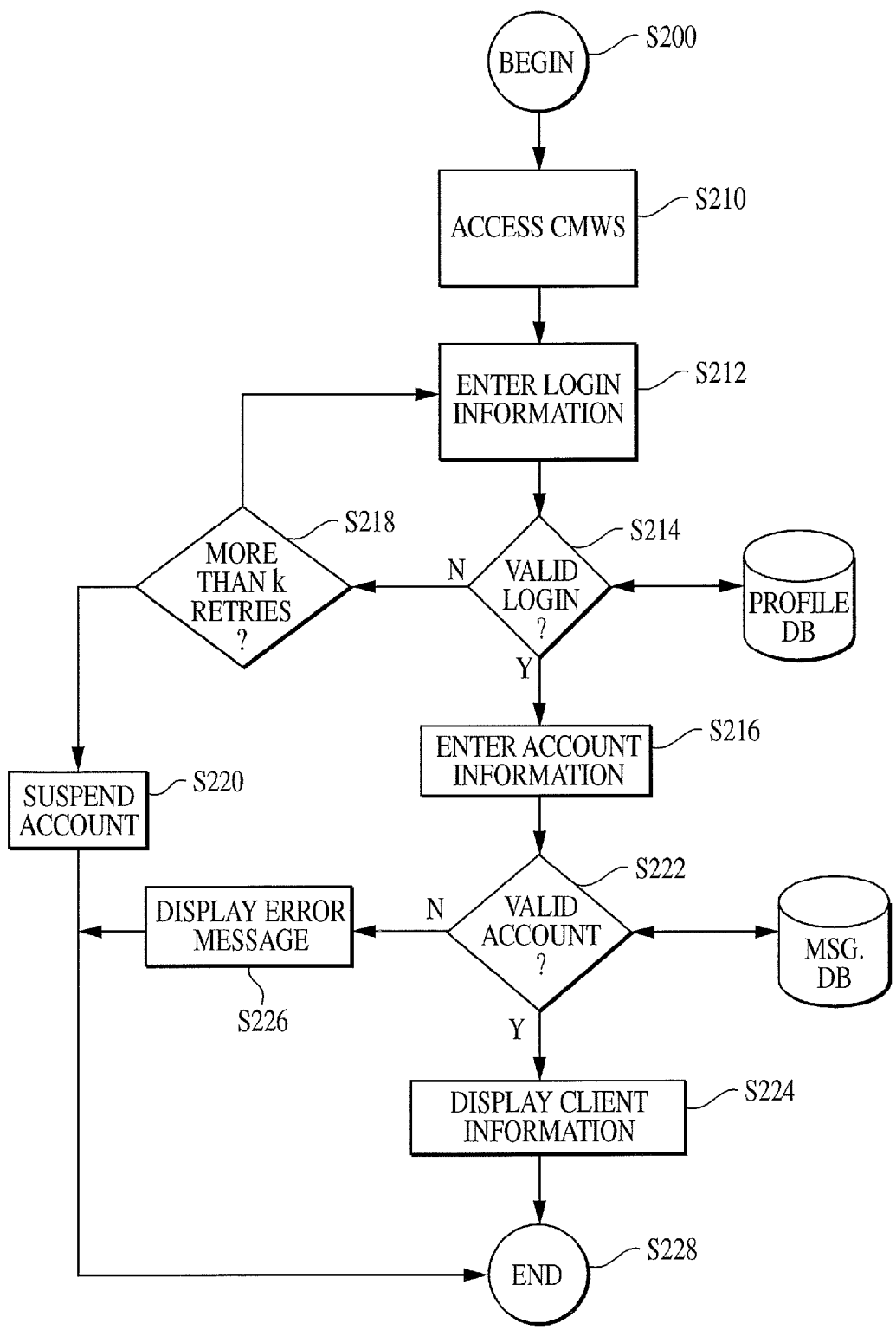
FIG. 2 is a flow chart illustrating the steps performed when authorizing access to the prescription benefits management system.

Turning now to FIG. 2, a flow chart is illustrated for showing the steps performed to gain access to the prescription benefits management system 100. The process begins at step S200, where the user would initiate a connection to the prescription benefits management system 100. At step S210, the user accesses the login screen 110. At step S212 the user enters the appropriate login information. As previously, discussed such information can include, for example, a username/password combination, an account number/password combination, etc. Regardless of the combination used, the values can be automatically assigned or selected by the user. If the login information entered by the user is not valid as determined at step S214, then control passes to step S218. While validating the log in information, data is accessed from a client profile database in order to verify the existence of the users account. The client profile database can include various information about the client including, for example, personal information about members (e.g., employers) and/or patients.

At step S218, a counter is initiated to determine how many attempts have been made to access the prescription benefits management system. A maximum number of attempts can be predefined in order to determine if a user may be attempting to gain unauthorized access to the prescription benefits management system 100. The counter can be incremented by one each time an unsuccessful login attempt is made. Thus, at step 218 if the number of attempts to access the prescription benefits management system 100 exceeds the predefined threshold value, then control passes to step S220. At step S220 appropriate restrictions are internally generated to suspend the user's account. In this instance, suspension can be based on, for example, the username for which the password has been improperly entered, or vice versa. Various other steps can be taken such as, for example, asking the user to answer a question for which the answer is known by the prescription benefits management system 100. The user can also be instructed to contact customer service to resolve the problem. In addition, a live (e.g., interactive) dialogue can optionally be initiated online with the customer service representative. If the number of attempts has not exceeded the threshold value, then control returns to step S212, where the user is again prompted to enter the login information.

At step S216, the user is prompted to enter an account information. The account information can correspond to data which uniquely identifies a client and/or particular patient within the prescription benefits management system 100. At step S222 it is determined whether the account information is valid. If the account information is not valid control passes to step S226, where an error message is displayed. Otherwise if the account information is valid then control passes to step S224 where the client information is displayed to the user.

According to one embodiment of the present invention, by providing a separate account information, the user can also be given the ability to access information outside of the prescription benefit management system 100. More particularly, the displayed client account can include client specific home pages with hot links and other personalized information. The hot links and home page addresses can re-direct the user to information stored outside the prescription benefits management system 100 such, as employer home pages and databases, warning and information regarding certain products, etc. Furthermore, while validating the account information, a message database containing comments and data specific to the client information is accessed to determine whether or not the account is valid. After the client information has been displayed, the authorization process is terminated at step S228.

Figure 3:
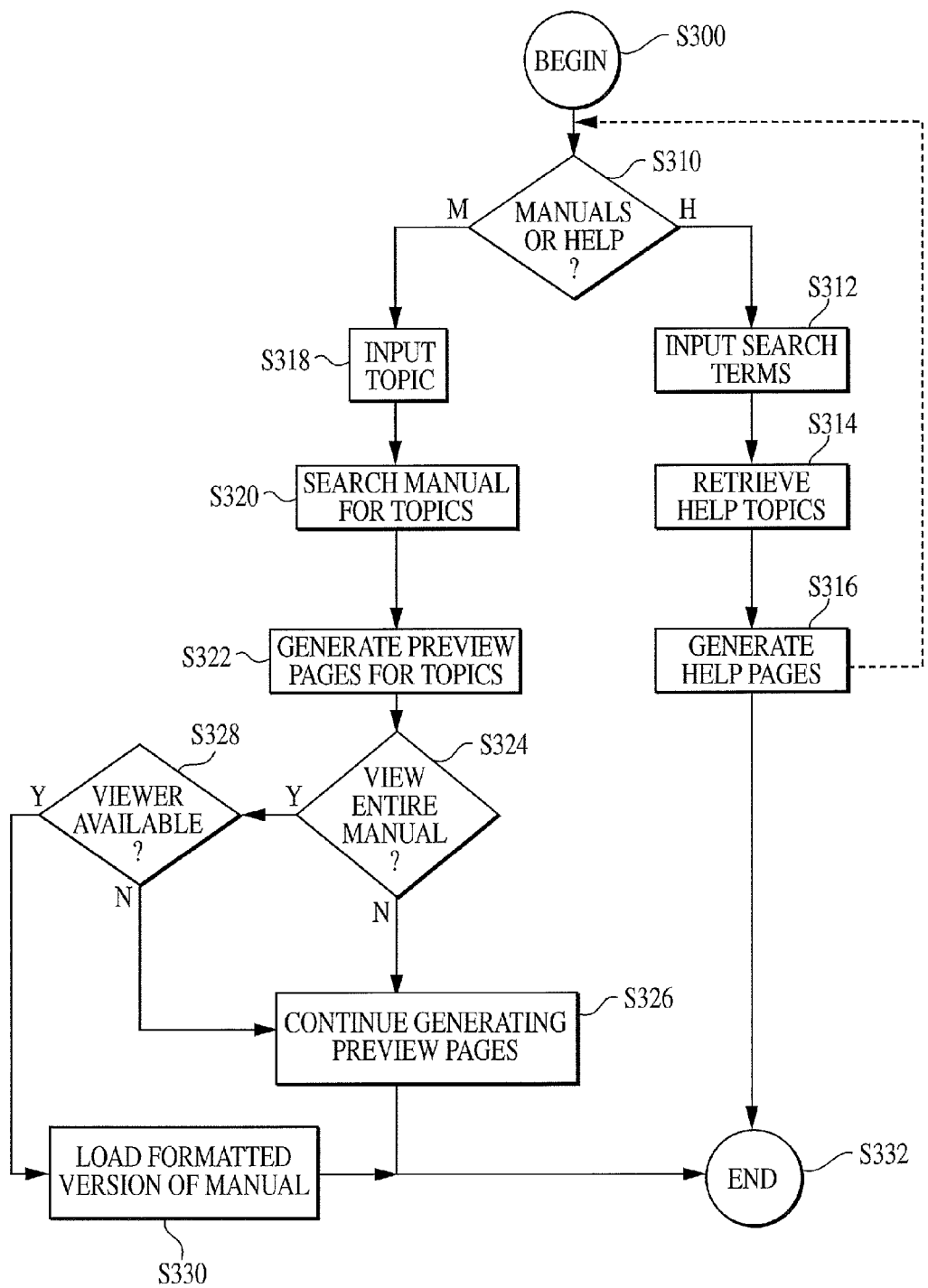
FIG. 3 is a flow chart illustrating the steps performed to obtain assistance in using the prescription benefits management system.

FIG. 3 illustrates additional details pertaining to the steps performed when obtaining assistance directly through the prescription benefits management system 100. The process begins at step S300 wherein, for example, the user would have selected the help and user manuals menu 114. At step S310, the user is prompted to provide an indication of whether they would like to access either the user manual or help on a particular topic. If a user would like help, then control passes to step S312 where the user is prompted to input various search terms. This can be in the form of a query page containing predefined search fields, or the user can be given an opportunity to conduct an advanced (or boolean) query. Alternatively, the user can be given an option to quickly view the help topics associated with the current page or menu level being accessed. Once the search terms have been entered and the search is initiated, the prescription benefits management system 100 retrieves a list of help topics at step S314. The list of help topics can be in the form of hypertext links that can be selected by the user. Once the link for a particular help topic is selected, a help page is generate at step S316 for viewing. After the user has finished examining the desired help pages, the process can be terminated. Alternatively, the user may be redirected to step S310 in order to conduct a new search or to view actual manual topics.

There are occasions, however, when the user will require more detailed and technical information than that available in the help pages. In such occasions, the user will typically elect to access the manuals at step S310. At step S318, the user is prompted to input the topics they would like to view in the user manuals. At step S320, the prescription benefits management system 100 conducts a search of available databases in order to retrieve information from the manuals regarding the search topics. At step S322, preview pages are generated for topics that have been retrieved during the search. The preview pages can correspond to predetermined amounts of data presented to the user in the form of a brief text file or a single HTML page. The user also has an option to view the entire manual, and can be prompted to do so at step S324. If the user does not desire to view the entire manual, then the preview pages continue to be generated at step S326. The process concludes when the user has viewed enough of the preview pages.

According to the disclosed embodiment of the invention, if the user would like to see the entire manual, then at step S328, it is determined whether a viewer is available for appropriately displaying the entire manual. Such a viewer can correspond to, for example, the Adobe Acrobat™ viewer or an appropriate word processing software. If an appropriate viewer is available, then control passes to step S330 where a formatted version of the manual is loaded and displayed. Otherwise, if there is no appropriate viewer available, then control passes to step S326 where the preview pages continue to be generated. Optionally, the user may be allowed to view the entire manual in HTML format using a conventional web browser. Once the user has finished viewing the manual, the process ends at step S332.

Figure 4:
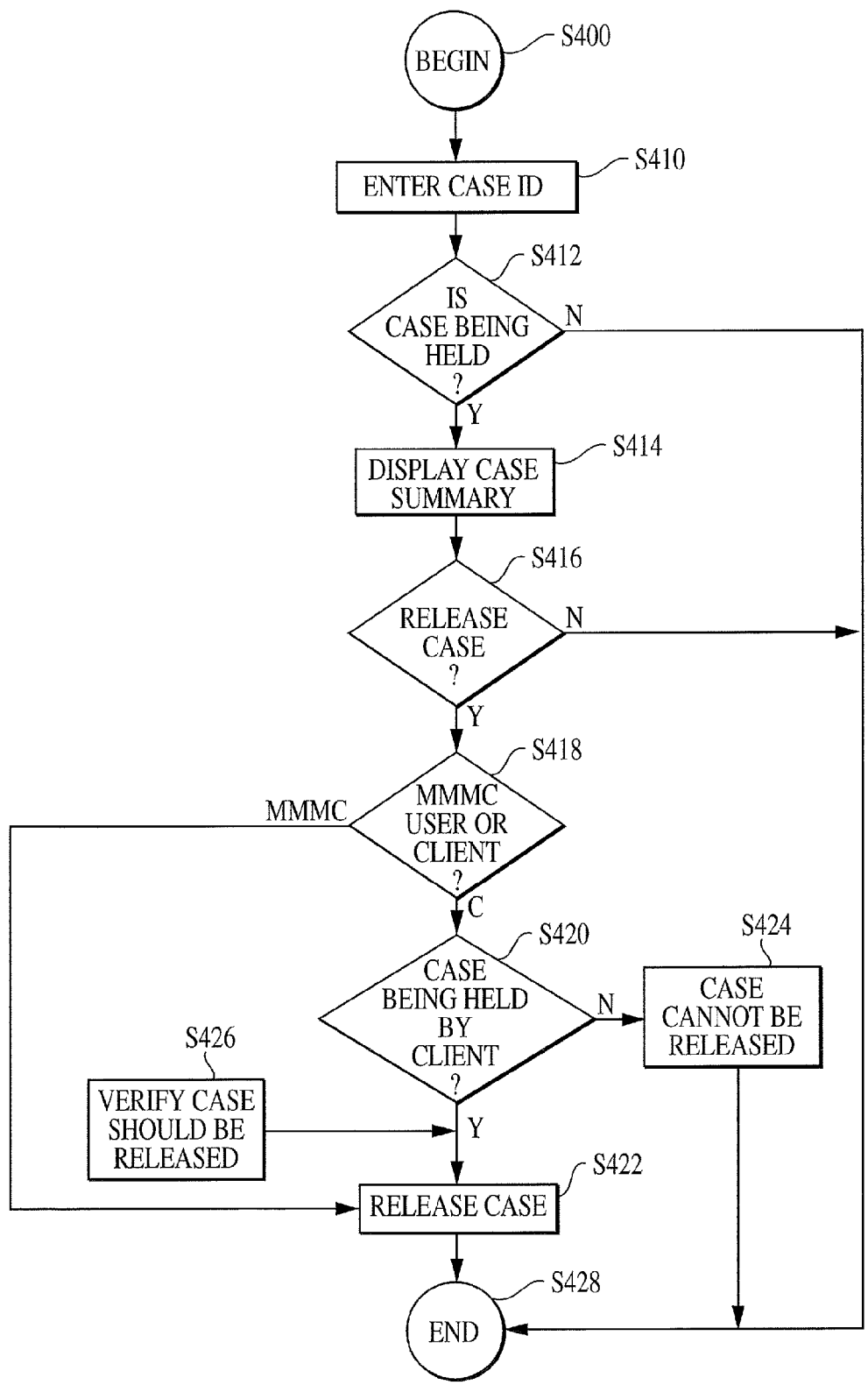
FIG. 4 is a flow chart illustrating the steps performed to release a case currently being held.

Turning to FIG. 4, the details for releasing a case record will now be described. The process begins at step S400. At step S410, the user enters or selects a case ID number. This can also correspond to a situation where a list of case records has been presented to the user as a result of a search request. Upon selecting a case or entering the case ID number, it is determined if the case record is currently being held at step S412. If the case record is not being held, then the release process terminates. If the case record is being held, the case summary is displayed at step S414. At step S416 the user is prompted to indicate whether the case record should be released. If the case record does not have to be released, then the process terminates. If the case record will be released, then at step S418 it is determined whether the user is an employee of the organization implementing the prescription benefits management system 100 or an outside client.

If the user is an employee, then control passes the step S422 where the case record is released. Otherwise, if the user is an outside client, than control passes to step S420 where additional criteria must be determined. At step S420, it is determined whether the case record is being held by a client. If the case record is being held by a client, then it is released at step S422. The prescription benefits management system 100 can optionally verify that the case record should be released at step S426 prior to actually releasing the case record. If the verification process results in a determination that the case record should not be released, then the process would automatically terminate. If at step S420, it is determined that the case record is not being held by a client, then at step S424 the user is given an indication that the case record cannot be released and the process terminates. This can correspond, for example, to a situation where the case record is being held by an employee who has administrative or higher level access rights than the client or user. After the case record has been released, the process ends at step S428.

Figure 5:
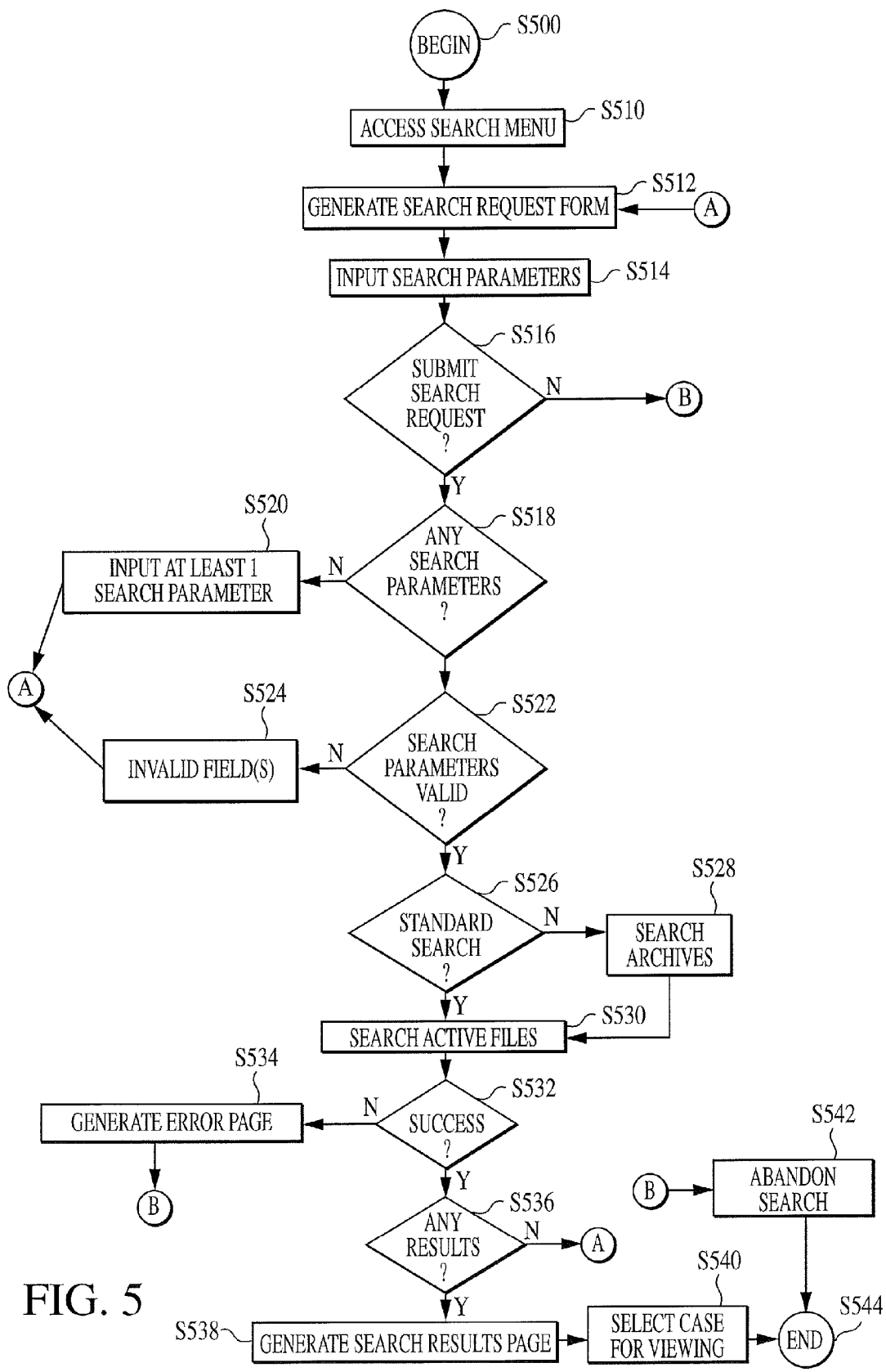
FIG. 5 is a flow chart illustrating the steps performed when conducting a search for case records.

FIG. 5 illustrates the steps performed when conducting a search for case records. The process begins at step S500. At step S510, the user accesses the search menu 122. In response, a search request form is generated at step S512. The user then inputs desired search parameters at step S514. At step S516, the user is optionally prompted to indicate whether the search a request should be submitted. If the search request will not be submitted, then control passes to control block B and ultimately to step S542 where the search is abandoned. If the user would like to submit the search request, the prescription benefits management system 100 determines if any search parameters have been entered in the search request form. The search parameters can include, without limitation, a case ID; a member ID; a patient's last name, first name, or date of birth; unlocked, or available cases; cases that require signing off; etc. If no search parameters have been entered, control passes to step S520 where the user is prompted to input at least one search parameter. Control then passes to block A and returns to step S512 where a new search request form is generated. Alternatively, block A can redirect the user to step S514.

If search parameters have been entered into the search request form, their validity is checked at step S522. For example, if a numeric search parameter such as a client account number is entered in a text field such as a patient name, then the search parameter would be invalid. If any of the search parameters are invalid, then control passes to step S524 where the user is informed that one or more search parameters are invalid. The invalid search parameters can optionally be displayed at this point. Control then passes to block A and returns to step S512 (or optionally step S514) where a new search research form is generated. Upon generating the new search request form, it is possible to maintain the valid search parameter so that the user does not have to reenter them. If the search parameters are valid then control passes to step S526.

The user is prompted to indicate whether a standard search should be conducted. If a standard search will be conducted, then control passes to step S530 where active files are searched. As previously discussed, the active files can include, for example, files from the last year, 18 months, 2 years, etc. If the user does not wish to conduct a standard search, then an extended search will be conducted. According to one exemplary embodiment of the present invention, in order to conduct the standard search, the archived files are first searched at step S528. Once the archived files have been searched, control passes to step S530, where the active files are also searched. Thus, the extended search would comprise both active and archived files.

At step S532, it is determined whether the search has been successfully conducted. If an error has occurred or the search was abruptly terminated, then control passes to step S534. An error page is generated and presented to the user to indicate the problems that were encountered during the search. Control then passes to block B and ultimately to step S542 where the search is abandoned. If the search was successfully conducted then control passes to step S536. It is then determined if any results were obtain based on the submitted search criteria. If results were not obtained, then the user can be redirected to step S512 where a new search request form can be generated. Otherwise, a search results page is generated at step S538. At step S540, the user can select a case record and view its details. Once the user has concluded viewing of the case record, the process is terminated at step S544. Optionally, the user can be redirected to the search results page (step S538) in order to view one or more additional case records.

Figure 6:
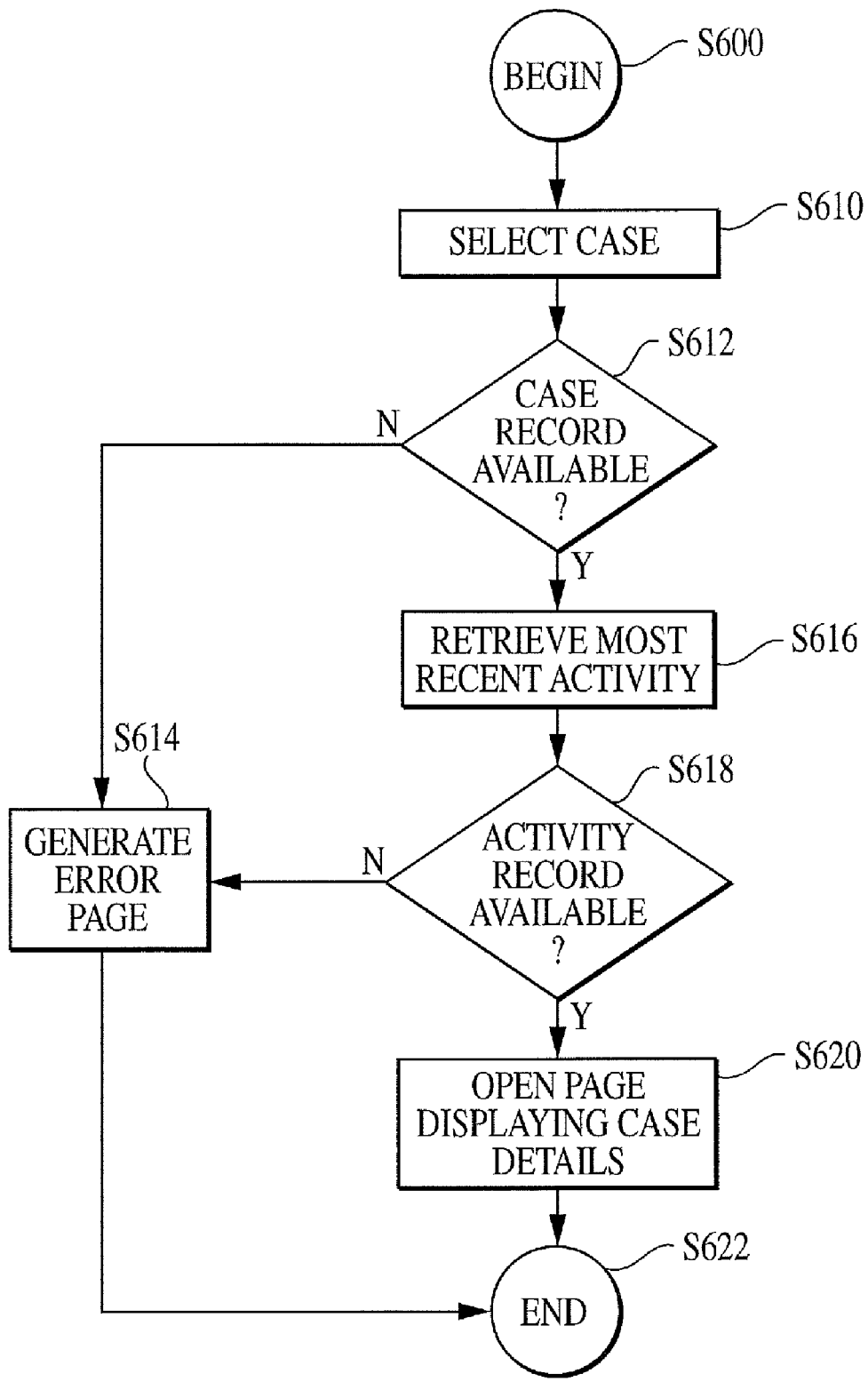
FIG. 6 is a flow chart illustrating the steps performed when the details of a case must be viewed.

FIG. 6 illustrates the steps performed when details of a case record must be viewed. The process begins at step S600. At step S610, the user selects a particular case record. This can be done by either inputting the case number or selecting a case record that has been presented as a result of a search request. At step S612, it is determined if case details are available for the desired case. If no case details are available then an error page is generated at step S614 and presented to the user. The process is then terminated. If a case details are available, then the most recent case activity is retrieved at step S616. At step S618, it is determined whether an activity record is currently available for the selected case record. The activity record corresponds to a record of any activities that have been conducted on the case record such as, for example, a communication, a review, a change in physician, etc. If no activity record is available, then an error page is again generated at step S614. If an activity record is available, then a new page is presented to the user at step S620 in order to display the details of the case record. The process would then terminate at step S622 after the user has viewed the details of the case record.

Figure 7:
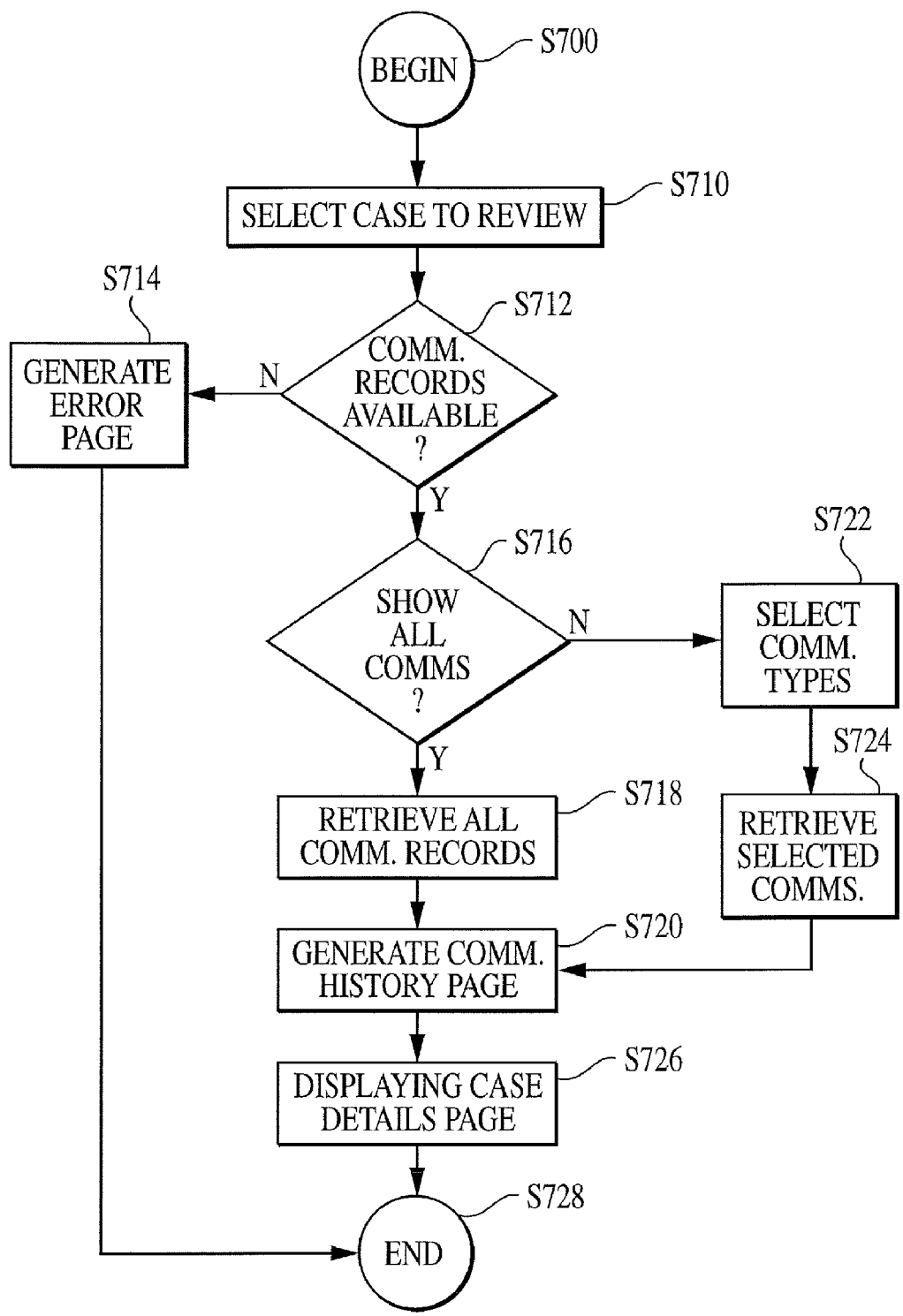
FIG. 7 is a flow chart illustrating the steps performed when reviewing the history of communications for a case.

FIG. 7 is a flowchart illustrating the steps performed when reviewing the coverage criteria 132 for a particular prescription claim. The review process would begin at step S700. The user would select a case to review at step S710. At step S712, the prescription benefits management system 100 determines if any communication records are available for the case record. If there are no communication records available, then an error page is generated at step S714 and presented to the user. The process would then end at step S728. If communication records are available the user is prompted to indicate whether all communications should be shown at step S716. If the user does not want to view all the communication records, then control to step S722. This corresponds to a situation wherein the user may only be interested in written correspondences that have been sent out to the patient, or possibly whether any appeals have been conducted. Accordingly, the user would select the specific sets of communication records that they would like to view at step S722. At step S724, the selected communication records are retrieved and displayed. Otherwise, all the communication records are retrieved at step S718. At step S720, a communication history page detailing the different communications and their dates is generated and presented to the user. The user can then optionally access the case detail page at step S726 in order to obtain further information regarding the case record. The process would end at step S728 after the user has finished reviewing the communication records and/or the case detail.

Figure 8:
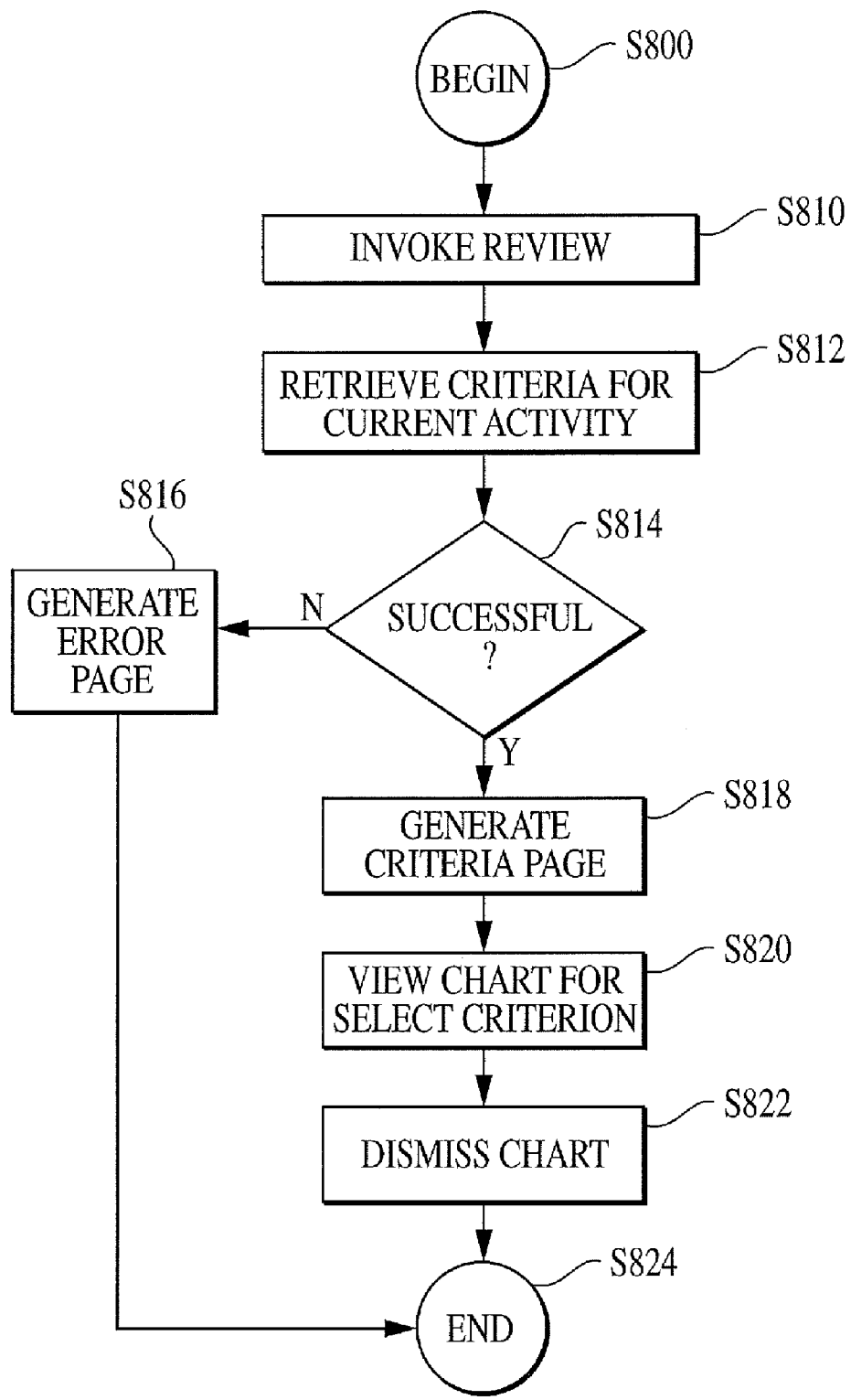
FIG. 8 is a flow chart illustrating the steps performed when reviewing the coverage criteria for a prescription.

FIG. 8 illustrates the steps performed to review coverage criteria for a prescription claim. The process begins at step S800. The user would invoke, or request, the review process at step S810. At step S812, the prescription benefits management system 100 retrieves various review criteria for the current activity. At step S814, it is determined whether the retrieval process was successful in obtaining matching records. If no records were retrieved, then an error page is generated at step S816 and presented to the user. Otherwise, a criteria page is generated and presented to the user at step S818. At step S820, the user reviews the chart for specified criteria. At step S822, the user can optionally dismiss the chart and terminate the process at step S824.

Figure 9:
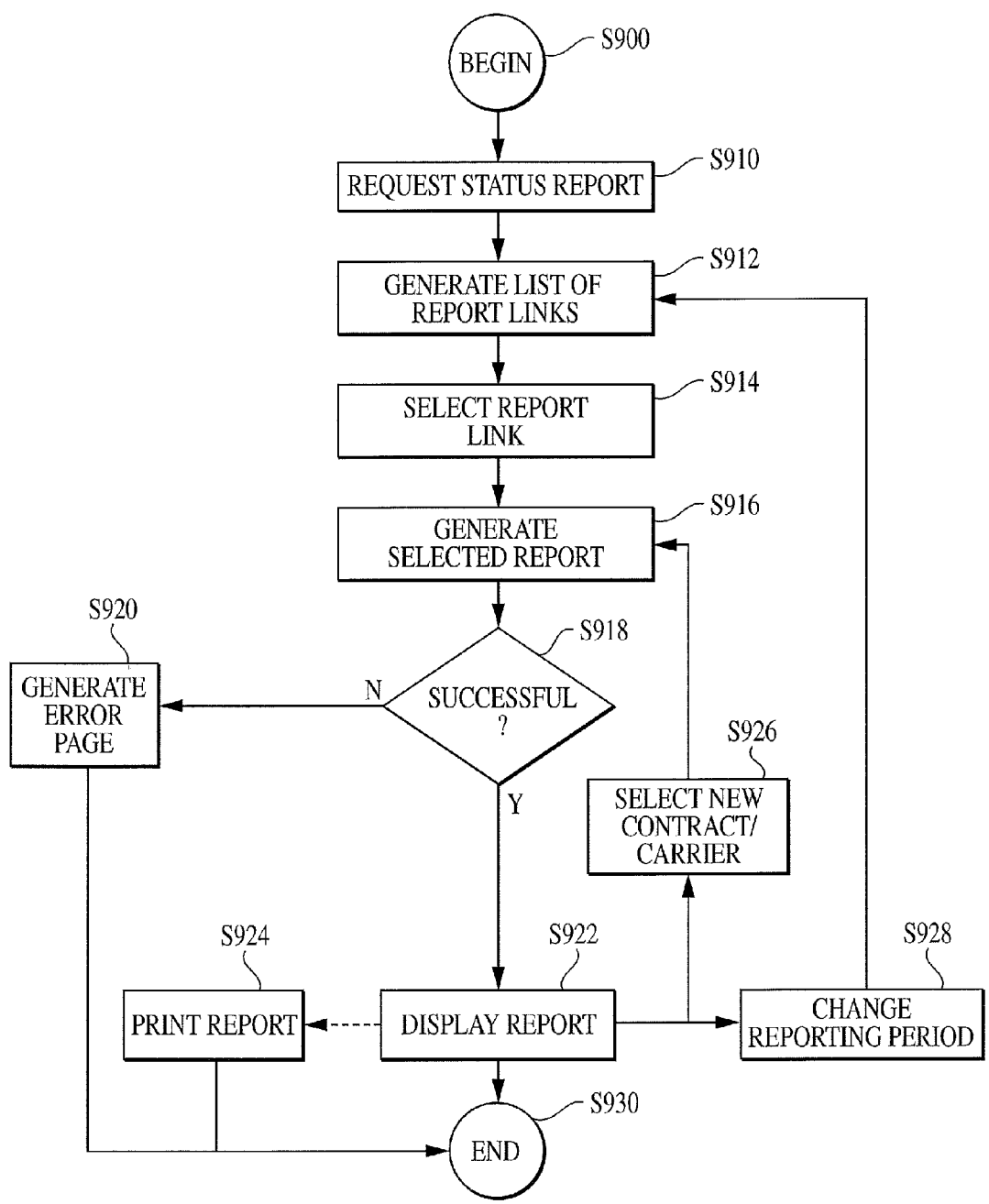
FIG. 9 is a flow chart illustrating the steps performed to review the status of a case.

FIG. 9 illustrates the steps performed to review the status of a case 116. The process begins at step S900. At S910 the user requests a status report for a particular case. At step S912, a list of report links is generated and presented to the user. At S914, the user selects the link to a report for which they would like to see the status. At step S916, the prescription benefits management system 100 generates a full report based on the report link selected by the user. As the report is being generated if any errors are encountered at step S918, then an error page is generated at step S920 and presented to the user. The process would then end. If the report was successfully generated, then the actual report is displayed to the user at step S922. At this point, the user can optionally be given an ability to print the report at step S924. Alternatively, the user can request that a report be generated for a different client, carrier, etc at step S926. Furthermore, the user can change the reporting period at step S928. Control would then return to step S912 where a new list of report links would be generated. Once the user is satisfied with review of the report, the process ends at step S930.

As can be appreciated, proper operation and maintenance of the prescription benefits management system 100 can require significant input and administrative control. In order to accomplish this, and to simultaneously ensure smooth operation of the system, certain users can be given high level administrative, or superuser, access. Such access would allow the user to create, edit, and manage data within the prescription benefits management system 100.

Figure 10:
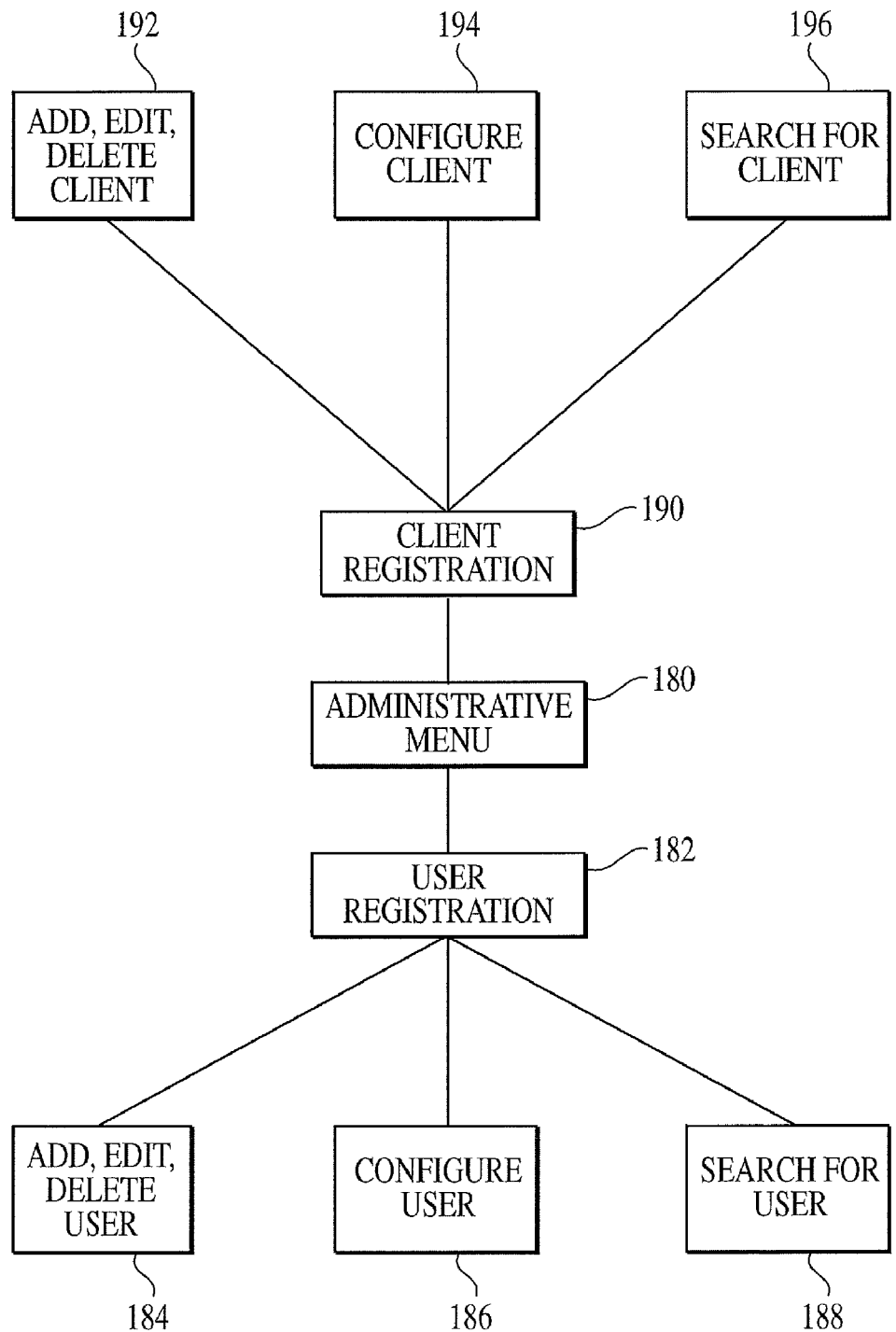
FIG. 10 is a block diagram illustrate exemplary functions accessible from an administrative menu.

Referring to FIG. 10, an exemplary administrative menu 180 and corresponding administrative functions are illustrated. The administrative menu 180 can be accessed by certain users in order to perform maintenance or special operations on the prescription benefits management system 100. As shown in FIG. 10, the exemplary administrative menu 180 branches out by means of two submenus. A user registration menu 182 allows the administrator to manage registration and restrictions on new users to the system. For example, the administrator would have the ability to add, edit, or delete users through menu 184. Menu 186 would allow the administrator to configure the user and with particular access rights. Menu 188 would allow the administrator to quickly search for and review information pertaining to a particular user. The administrator can also access a client registration menu 190. From the client registration menu 190, the administrator would able to add, delete, or edit client information through menu 192. Menu 194 would allow the administrator to configure the access rights of the client. Finally, menu 196 would allow the administrator to search for a particular client in order to review and/or modify their information.

Figure 11:
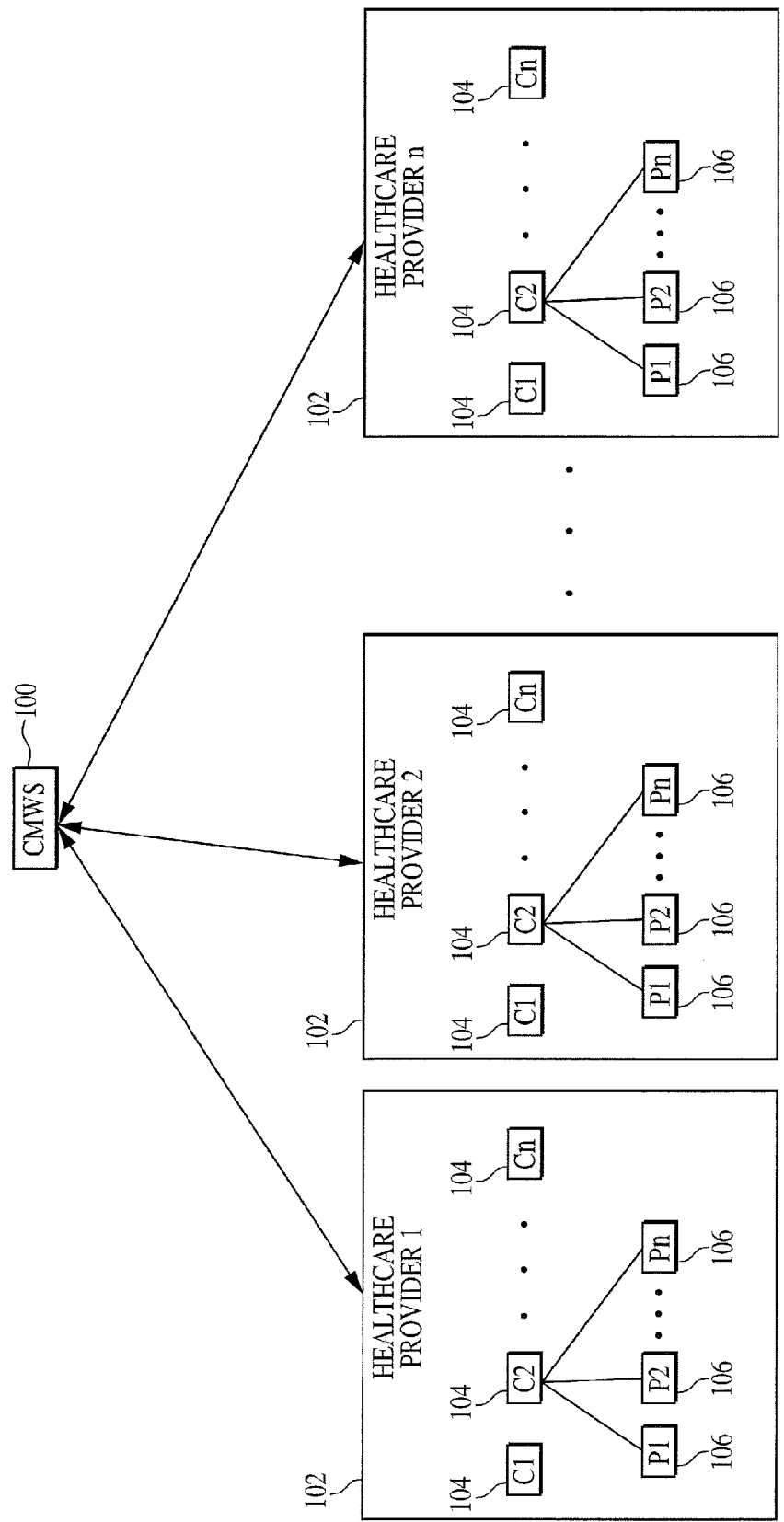
FIG. 11 illustrates an arrangement for managing prescription benefits according to an exemplary embodiment of the invention.

FIG. 11 illustrates an exemplary implementation of the present invention for managing multiple prescription benefits programs. According to the exemplary embodiment, the prescription benefits management system 100 is implemented as a rules-based coverage management system (CMWS), as previously discussed. The prescription benefits management system 100 includes appropriate database management systems (not shown) for storing case records and associated information. External or internal storage devices can also be used if a large number of case records exist, or to provide capacity for expanding the number of case records available.

According to the disclosed embodiment of the invention, the prescription benefits management system 100 is used for managing prescription benefits from one or more healthcare providers 102. The healthcare provider 102, in turn, provides services to multiple employers such as, for example, clients 104. As can be appreciated, each healthcare provider 102 can offer multiple prescription benefits plans to each client 104. The clients 104 ultimately offer the prescription benefits plans their employees (e.g., patients 106) as part of an employment package. Case records are created for each patient 106, depending on various factors, including the selected prescription benefits plan, the type of treatment and/or product used by the patient, the number and type of communications with the patient, etc.

Each healthcare provider 102 is capable of establishing a communication link with the prescription benefits management system 100. The communication link can be established using various types of networks including, open networks, closed networks, the internet, direct dial networks, etc. A customer service representative, or appropriate personnel, can initiate contact with the prescription benefits management system 100 in order to review, create, and/or delete case records. Administrators of the prescription benefits management system 100 can optionally exercise control over the type of data being accessed and/or modified through the communication channel. This can be implemented using various methods including, for example, a password/access right system. Thus, a certain degree of control can be maintained over the amount and type of data accessed.

One optional embodiment of the present invention allows various levels of remote access to various external users. For example, an representative of the healthcare provider 102 could be given access to review, modify, and/or delete various information within a case record. A client 104 could be given access to view case records for their patients 106. Each patient 106 could be given access to view certain data contained in their case record. As can be appreciated, the healthcare providers 102, the clients 104, and the patients 106 have access to computers, terminals, and/or appropriate communication devices for accessing the prescription benefits management system 100. Additionally, the prescription benefits management system 100 can be configured to establish multiple communication channels simultaneously.

Major objectives and advantages of the present invention are convenience and cost reduction (where appropriate, safe, and effective). The prescription benefits management system of the present invention stands to benefit healthcare providers, pharmacies, and patients. More particularly, healthcare providers can perform functions necessary to manage prescription benefit plans more efficiently, thereby reducing the cost of coverage and improving the number and quality of products available to patients. Certain tasks, such as appeals and reviews can be performed quickly and efficiently while records of the transactions are automatically generated and maintained. For example, upon reviewing a prescription coverage denial, various criteria could support a reversal of the original denial. All the information and documentation used to support the reversal would be automatically stored in the system. Furthermore, certain correspondence could be immediately generated for delivery to the patient. Thus, patients receive several additional benefits. The time for reviewing and reversing appeals can be greatly reduced. Throughout the review process, correspondence can be directed to the patient to indicate the status of an appeal or review.

The present invention provides further functions that allow a user to conveniently manage a prescription benefits program. These abilities include, but are not limited to: browsing coverage related information, aggregating coverage activities summary, administering appeal procedures, and generating related correspondence. The present invention is capable of administering coverage reviews and generating related correspondence, tracking and managing contacts/communications with members, physicians, and pharmacist, and creating and maintaining prescription coverage criteria. Additionally the prescription benefits management system can optionally be remotely accessed by patients and other users to obtain and review information regarding their prescription benefits program.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of managing prescription benefits offered by a plurality of providers of prescription benefits, comprising:
    storing prescription benefit case records in a prescription benefits management computer system for users at least one of receiving or administrating one of a plurality of prescription benefits coverage plans from at least one of the plurality of providers of prescription benefits, said prescription benefit case records comprising information regarding patients and prescription coverage activities including at least one of a type of treatment associated with the prescription benefits coverage, pharmaceutical product used by the patient when present, and a number and type of communications with the patient associated with the prescription benefits coverage, accessible to the users responsive to the one of the plurality of prescription benefits coverage plans;
    providing access to the plurality of prescription benefits coverage plans from the at least one of the plurality of providers of prescription benefits using said prescription benefits management computer system to respective plurality of providers of prescription benefits over one or more electronic communication networks;
    receiving a request to access said prescription benefits management computer system from the user of at least one of the plurality of providers of prescription benefits from remote locations via one or more electronic communication networks, wherein access to said prescription benefits management computer system is provided based on at least one of a plurality of preconfigured access rights corresponding to at least one of the user and the provider of the prescription benefits offered through the one of the plurality of prescription benefits coverage plans from the at least one the plurality of providers of prescription benefits;
    selecting at least one of a plurality of prescription coverage activities contained in said prescription benefit case records corresponding to the prescription benefits coverage plan;
    conducting an inquiry on said prescription benefit case records to view and reviewing selected prescription coverage activities contained in said prescription benefit case records responsive to the request from the user, wherein the inquiry to view and review the selected prescription coverage activities further comprises displaying a plurality of options to access said prescription coverage activities for the user based on the at least one of a plurality of preconfigured access rights, and selecting at least one of the plurality of options to access said prescription coverage activities,
    reviewing details of the prescription coverages, and at least one of overriding the displayed prescription coverage based on one or more clinical and prescription criteria, replacing an original prescription product with a substitute prescription product that is covered by a prescription benefit plan associated with the case record, and appealing the prescription coverage denial based on clinical reasons in response to receiving a request from the user,
    selecting a new prescription benefit case record for prescription benefits,
    determining whether the new case record is currently being viewed by a second user,
    receiving instructions from user to release the new case record if the new case record is currently being viewed by the second user,
    determining whether the user is an employee of at least one organization, offering the one of the plurality of prescription benefits coverage plans from the at least one of the plurality of providers of prescription benefits, implementing the prescription benefits management computer system,
    releasing the new prescription case record without the second user's authorization if the second user is at least one of an employee and a client of the organization implementing the prescription benefits management computer system, and closing said prescription benefit case records.

2. The method of claim 1 further comprising a step of accessing at least one of a help manual and a user manual stored in electronic form on the prescription benefit management computer system to obtain instructions for assisting in operating the system.

3. The method of claim 1, further comprising a step of displaying a status report identifying at least approvals/denials of claims for prescription coverage.

4. The method of claim 1, further comprising a step of viewing a reference library containing a collection of documents used to support decisions made on a case record.

5. The method of claim 1, wherein the step of accessing further comprises a step of displaying case activity details corresponding to either specific information on the patient or prescription coverage activities for the patient, after the case record has been accessed.

6. The method of claim 1, wherein the step of conducting further comprises the steps:
    inquiring on communication items relating to the case record; and displaying details of all communication items that have occurred in the case record, including at least the medium and direction of each communication item.

7. The method of claim 1, further comprising a step of reviewing a coverage criteria for the case record subsequent to the step of conducting an inquiry, wherein the coverage criteria comprises information which led to a particular decision on the case record.

8. The method of claim 1, further comprising a step of displaying an activity report containing all prescription coverage activities and reference data for the case record.

9. The method of claim 1, further comprising a step of displaying coverage activity details for the selected case record, the coverage activity details including at least a list of products, a list of coverage products, and a list of product categories.

10. The method of claim 1, wherein the selected case record contains at least one prescription coverage denial, and further comprising the steps:
   displaying one or more reasons for each coverage denial; and
   reviewing details of the displayed reasons.

11. The method of claim 10, wherein the case record is being reviewed by an administrator and further comprising a step of overriding the displayed coverage denial based on one or more clinical criteria.

12. The method of claim 10, further comprising a step of processing appealing the coverage denial based on clinical reasons, and wherein the coverage denial may be reversed or upheld.

13. The method of claim 12, wherein the step of processing an appeal further includes a step of replacing an original prescription product with a substitute prescription product that is covered by a prescription benefit plan associated with the case record.

14. The method of claim 12, wherein the step of processing an appeal further comprises the step of viewing entries generated by prior reviews of at least one of the case record and any coverage denials thereof.

15. The method of claim 1, further comprising a step of creating a new review for the selected case record, and entering prescription coverage activity information for the case record.

16. The method of claim 1, wherein an administrator is accessing the case record, and further comprising the steps:
   changing a security status of the selected case record from a locked status to an unlocked status; and
   entering changes to one or more case parameters.

17. The method of claim 16, further comprising a step of generating correspondence to be sent to a patient identified in the case record.

18. The method of claim 1, further comprising a step of automatically generating status reports for one or more clients at predetermined intervals.

19. The method of claim 1, further comprising a step of automatically generating and maintaining a record of all transactions performed while using the prescription benefits management computer system.

20. The method of claim 1, further comprising providing the user access to said prescription benefits management computer system based on authority to at least one of:
   view, change, modify, and create information stored in the prescription benefits management computer system.

21. The method of claim 1,
   wherein the preconfigured access rights comprises authority for an administrative user of the at least one of the plurality of providers of the prescription benefits, and
   wherein said method further comprises providing access to the administrative user of the at least one of the plurality of providers of the prescription benefits to change, modify, and create information stored in the prescription benefits management computer system.

22. The method of claim 21,
   wherein the preconfigured access rights comprises authority for a staff member of the prescription benefits management computer system, and
   wherein said method further comprises providing access to the staff member to view, change, and modify information stored in the prescription benefits management computer system.

23. The method of claim 1, further comprising:
   providing the at least one of the plurality of prescription benefits providers authority to view information stored in the prescription benefits management computer system, and
   providing the at least one of the plurality of prescription benefits providers authority to respond to questions, and
   providing the at least one of the plurality of prescription benefits providers authority to enter information into fauns for storing in the prescription benefits management computer system.

24. The method of claim 1,
   wherein the preconfigured access rights comprises authority for an administrative user of the at least one of the plurality of providers of the prescription benefits, and
   wherein said method further comprises providing access to the administrative user to modify at least one of the plurality of case records of a member of the at least one of the plurality of providers of the prescription benefits stored in said prescription management computer system without the at least one user of the at least one of the plurality of providers releasing the at least one of the case records.

25. The method of claim 1,
   wherein the preconfigured access rights comprises authority for an administrative user of the at least one of the plurality of providers of the prescription benefits, and
   wherein said method further comprises providing access to the administrative user to release at least one of the plurality of case records of a member of the at least one of the plurality of providers of the prescription benefits stored in said prescription management computer system held open by the at least one user of the at least one of the plurality of providers.

26. The method of claim 1,
   wherein the preconfigured access rights comprises authority for an administrative user of the at least one of the plurality of providers of the prescription benefits, and
   wherein said method further comprises providing access to the administrative user to modify coverage criteria information, wherein the coverage criteria information comprises a decision regarding coverage for at least one of a product and treatment.

27. The method of claim 1, further comprising displaying the activity report for a case record comprising user identifier, carrier information, contract information, physician, patient, member, coverage criteria, and reasons for denial.

28. The method of claim 1, further comprising:
   receiving at least one search term from the user to search for at least one predetermined case record using a search parameter page generated by the prescription benefit management computer system, wherein the search parameter page includes an archive parameter; and conducting a search for the at least one predetermined case record using the search parameter page generated by the prescription benefit management computer system for the user.

29. The method of claim 28, further comprising upon retrieving multiple case records from the search:
selecting at least one desired case record for review by said prescription benefit administrator,
automatically capturing identification data from the at least one desired case record by said prescription benefit management computer system,
conducting at least one subsequent case record specific search by said prescription benefit administrator, and
filtering the at least one subsequent case record specific search results with respect to the at least one selected case record using the identification data by said prescription benefit management computer system.

30. A system for managing prescription benefits offered by a plurality of providers of prescription benefits, comprising:
a prescription benefits management computer system, for storing prescription benefit case records for patients receiving one of a plurality of prescription benefits coverage for the plurality of providers of prescription benefits, said prescription benefit case records comprising information regarding the patients and prescription coverage activities including at least one of a type of treatment associated with the prescription benefits coverage, pharmaceutical product used by the patient when present, and a number and type of communications with the patient associated with the prescription benefits coverage, pharmaceutical product used by the patient when present, and a number and type of communications with the patient associated with the prescription benefits coverage, accessible to the patient responsive to the one of the plurality of prescription benefits coverage plans;
a communication device operatively coupled to said prescription benefits management computer system for providing access to the plurality of prescription benefits coverage plans from the at least one of the plurality of providers of prescription benefits using said prescription benefits management computer system to respective plurality of providers of prescription benefits over one or more electronic communication networks; and
said prescription benefits management computer system for receiving a request to access said prescription benefits management computer system from a user of at least one of the plurality of providers of prescription benefits utilizing at least one user computer from remote locations via said one or more electronic communication networks, wherein access to said prescription benefits management computer system is provided based on at least one of a plurality of preconfigured access right corresponding to at least one of the user and the provider of the prescription benefits offered through the one of the plurality of prescription benefits coverage plans from the at least one of the plurality of prescription benefits; said prescription benefits management computer system being configured to allow users to:
select at least one of a plurality of prescription coverage activities contained in said prescription benefit case records corresponding to the prescription benefits coverage plan;
conduct an inquiry on said prescription benefit case records to view and review selected prescription coverage activities contained in said prescription benefit case records responsive to the request from the user, wherein the inquiry to view and review the selected prescription coverage activities further comprises displaying a plurality of options to access said prescription coverage activities for the patient based on the at least one of a plurality of preconfigured access right, and selecting at least one of the plurality of options to access said prescription coverage activities,
display one or more reasons for each prescription coverage, and reviewing details of the displayed reasons, and at least one of overriding the displayed prescription coverage denial based on one or more clinical and prescription criteria, replacing an original prescription product with a substitute prescription product that is covered by a prescription benefit plan associated with the case record, and appealing the prescription coverage denial based on clinical reasons in response to receiving a request from a user,
select a new prescription benefit case record for prescription benefits,
determine whether the new case record is currently being viewed by a second user,
receive instructions from user to release the new case record if the new case record is currently being viewed by the second user,
determine whether the user is an employee of at least one organization, offering the one of the plurality of prescription benefits coverage plans from the at least one of the plurality of providers of prescription benefits, implementing the prescription benefits management computer system,
release the new prescription case record without the second user's authorization if the second user is at least one of an employee and a client of the organization implementing the prescription benefits management computer system,
modify information contained in the prescription benefit case record, and
close said prescription benefit case records.

31. A method of managing prescription benefits offered by a plurality of providers of prescription benefits, comprising:
storing prescription benefit case records in at least a prescription benefits management computer system for users receiving and/or administrating one of a plurality of prescription benefits coverage-plans from at least one of the plurality of providers of prescription benefits;
providing access to the plurality of prescription benefits coverage plans from the at least one of the plurality of providers of prescription benefits using said prescription benefits management computer system to respective plurality of providers of prescription benefits over one or more electronic communication networks;
receiving a request to access said prescription benefits management computer system from a user of at least one of the plurality of providers of prescription benefits from remote locations via one or more electronic communication networks, wherein access to said prescription benefits management computer system is provided based on at least one of a plurality of preconfigured access right corresponding to at least one of the user and the provider of the prescription benefits offered through the one of the plurality of prescription benefits coverage plans from the at least one of the plurality of providers of prescription benefits;
selecting at least one of a plurality of prescription coverage activities contained in said prescription benefit case records corresponding to the prescription benefits coverage plan;

conducting an inquiry on said prescription benefit case records to view and reviewing selected prescription coverage activities contained in said prescription benefit case records responsive to the request from the user, wherein the inquiry to view and review the selected prescription coverage activities further comprises displaying a plurality of options to access said prescription coverage activities for the at least one patient based on the at least one of a plurality of preconfigured access rights, and selecting at least one of the plurality of options to access said prescription coverage activities, generating one or more reasons for each prescription coverage, and reviewing details of the displayed reasons, and at least one of overriding the displayed prescription coverage denial based on one or more clinical and prescription criteria, replacing an original prescription product with a substitute prescription product that is covered by a prescription benefit plan associated with the case record, and appealing the prescription coverage denial based on clinical reasons in response to receiving a request from the user, selecting a new prescription benefit case record for prescription benefits, determining whether the new case record is currently being viewed by a second user, releasing the new prescription case record without the second user's authorization when the user is determined to be the a clinical user, modifying information contained in the prescription benefit case record, and closing said prescription benefit case records.

* * * * *